F. R. BATCHELDER.
CARTRIDGE BELT OR BANDOLEER.
APPLICATION FILED MAR. 16, 1907.

920,413.

Patented May 4, 1909
4 SHEETS—SHEET 1.

Witnesses
W. H. Bevans
Kenneth P. Clarke

Inventor
Frank R. Batchelder
By James W. Bevans
his Attorney

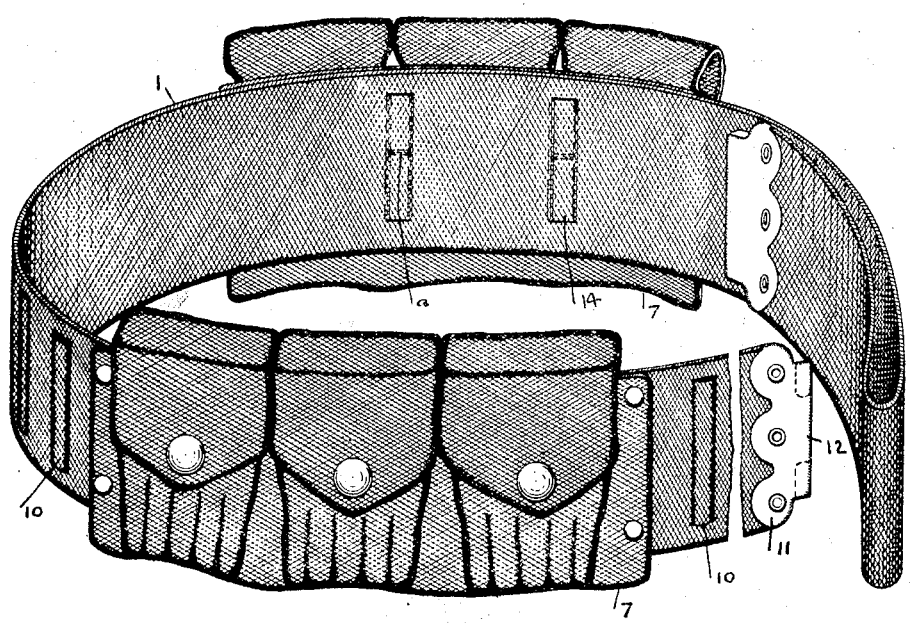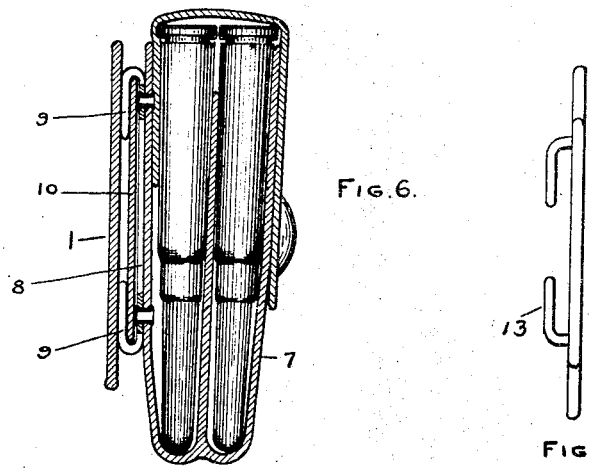

F. R. BATCHELDER.
CARTRIDGE BELT OR BANDOLEER.
APPLICATION FILED MAR. 16, 1907.
920,413.
Patented May 4, 1909.
4 SHEETS—SHEET 3.
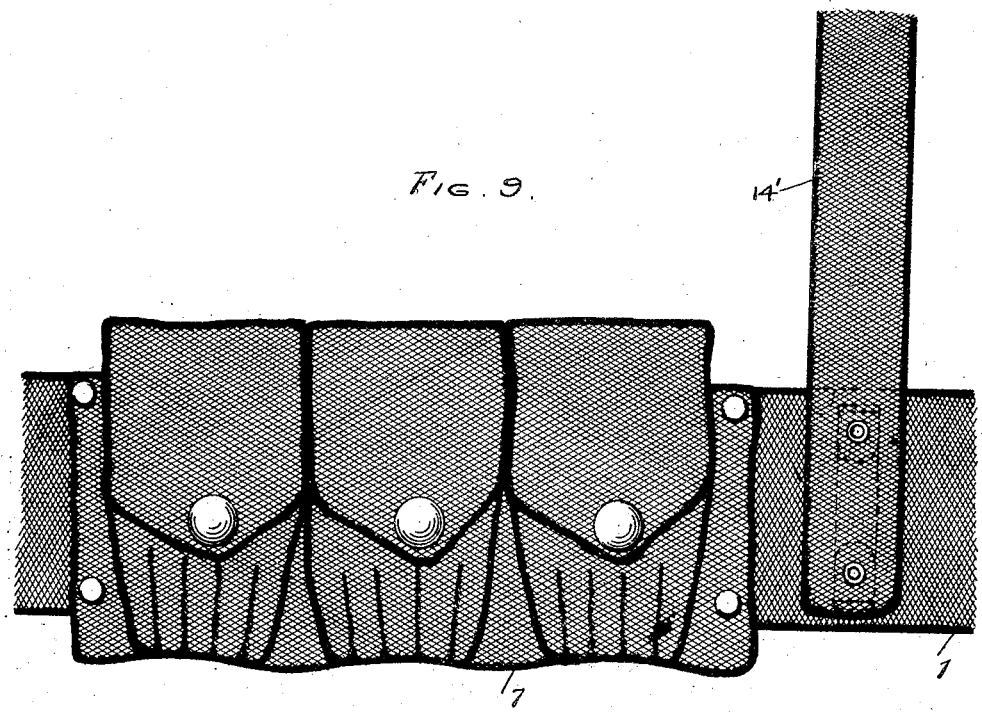
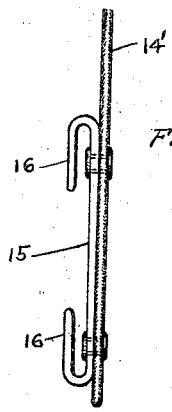

F. R. BATCHELDER.
CARTRIDGE BELT OR BANDOLEER.
APPLICATION FILED MAR. 16, 1907.

920,413.

Patented May 4, 1909.
4 SHEETS—SHEET 4.

UNITED STATES PATENT OFFICE.

FRANK R. BATCHELDER, OF WORCESTER, MASSACHUSETTS, ASSIGNOR TO MILLS WOVEN CARTRIDGE BELT COMPANY, OF WORCESTER, MASSACHUSETTS, A CORPORATION OF MASSACHUSETTS.

CARTRIDGE BELT OR BANDOLEER.

No. 920,413.          Specification of Letters Patent.          Patented May 4, 1909.

Application filed March 16, 1907. Serial No. 362,725.

*To all whom it may concern:*

Be it known that I, FRANK R. BATCHELDER, a citizen of the United States, residing at Worcester, in the county of Worcester and State of Massachusetts, have invented certain new and useful Improvements in Cartridge Belts or Bandoleers, of which the following is a specification.

This invention relates to improvements in cartridge belts or bandoleers, and the object is to provide means for attaching the cartridge pockets or pouches to the belt, and also improved means for detachably connecting the ends of the suspenders to the belt.

Figure 1:
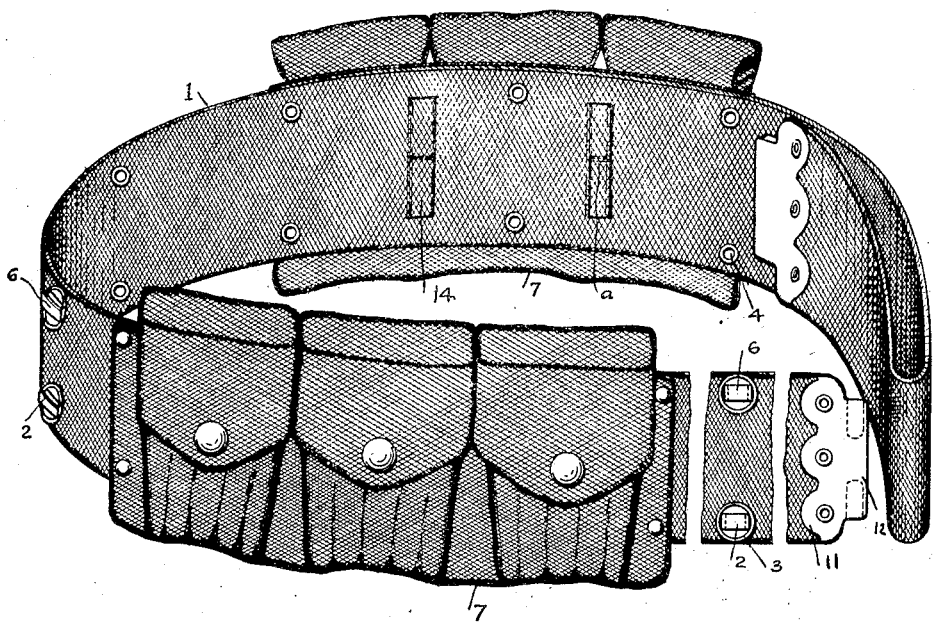
Figure 2:
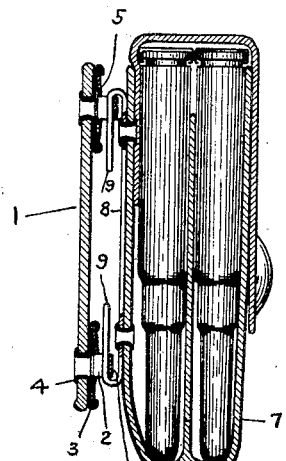
Figures 3, 4:
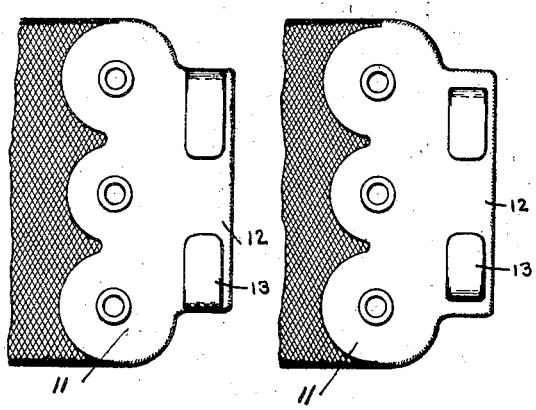
Figure 11:
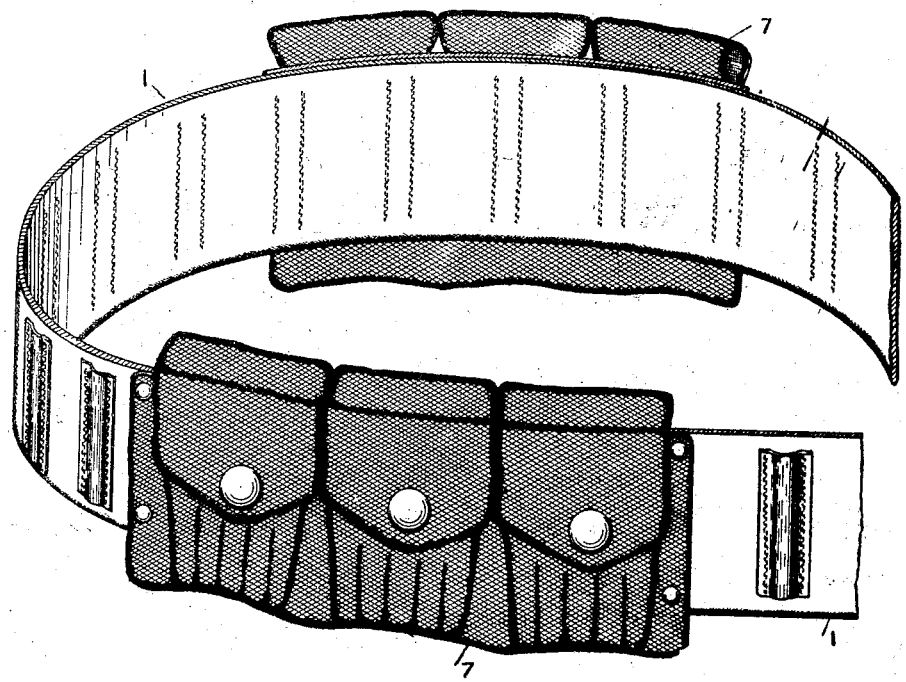

In the accompanying drawings:—Figure 1 is a view of a woven cartridge belt with cartridge pockets or pouches attached thereto, the same embodying one form of my invention; Fig. 2, a transverse sectional view through one of the cartridge pockets or pouches and the belt; Fig. 3, a face view of the end-plate of the belt showing my improved fastening means; Fig. 4, a similar view of a modified construction of end-plate; Fig. 5, a view of a belt and carrier showing another modification of my invention; Fig. 6, a transverse sectional view through the belt and cartridge pocket; Fig. 7, an edge view of the end-plate shown in Fig. 3; Fig. 8, an edge-view of the end-plate illustrated in Fig. 4; Fig. 9, a view of the belt and cartridge-pockets or pouches shown in Fig. 5, showing the improved means for attaching the suspenders to the belt; Fig. 10, a view illustrating in detail said suspender attaching means, and Fig. 11, a view of a leather belt constructed in accordance with my invention.

Cartridge belts heretofore provided having detachable carriers have been constructed in two types;—1st—those in which the carriers are provided with metal fingers passing through eyelets set in the body of the carriers or fixed to its back, said fingers either engaging eyelets fixed in the body of the belt or passing over the selvage of the belt at its respective edges and extending upon the rear face thereof. 2nd—carriers provided with loops of leather or woven fabric either firmly attached at their respective ends to the rear sides thereof or firmly attached at one end and made detachable at the other end by means of various forms of fastening devices, the carrier being positioned upon the belt by passing the latter through the loops in one case and in the other by placing the loops around the belt and securing the free ends thereof by means of the fastening devices provided. These methods of attaching carriers to belts or bandoleers are open to the following objections:—In either of the cases recited, the belt does not lie flat against the soldier's waist by reason of the metal fingers or the loops which intervene between the back of the belt and the soldier's body. The metallic fingers abrade the soldier's clothing and are liable to chafe and bruise his body, especially when, as in tropical climates, he is lightly clad. The metallic fingers where they engage the selvage of the belt, are open to a further objection, namely, that they will either wear into the selvage or by the constant engagement therewith rub it so smooth that the carrier will not remain fixed in the desired position, but will slip along owing to the shock or jar which it will sustain on a long march, and by this slipping will tend to wear the selvage. The loops of leather or fabric are open to the same objections, namely, that they are also liable to cause irritation, and, in the case of permanent loops through which the belt is passed in order to receive the carrier, the latter cannot be detached without unfastening the belt. That portion of my present invention directed to the means for attaching the cartridge carrier, removes all of these objections by providing means for detachably securing the carrier to the belt without the intervention of anything between the back of the belt and the soldier's body and by so constructing this means that the carrier may be readily attached to and detached from the belt without unfastening the latter, and by which the carrier may be adjusted on the belt and at the same time securely held in the desired place.

My invention further consists in adapting the form of improved cartridge-carrier attaching means, to the suspenders for detachably securing the latter to the belt, and utilizing the same sleeves or metal loops by which the carrier is attached to the belt.

In the form of my invention illustrated in Fig. 1, I have provided a belt 1, which is of the ordinary woven fabric type, having fixed upon the front face thereof at intervals, pairs of metal loops 2, the loops of each pair being in vertical alinement. These loops are formed of two parts, the base part consisting of a substantially cup-shaped portion 3 and an integral eyelet 4, and a loop portion comprising a disk or base-portion 5 from the center of which a loop 6 has been struck up. The disk 5 is placed in the cup 3 and secured by clenching the flange of the cup thereover, and the eyelet is then inserted in the fabric of the belt and clenched upon the rear face thereof. I have thus provided a fastener which is of great strength, whereby it will resist almost any strain upon the loop. 7 designates the cartridge-carrier which may consist of one or more woven pockets to receive the cartridges singly or in clips, here shown as consisting of a series of three pockets. Secured to the rear side of the carriers are clips 8, of the contour in edge elevation of the capital letter C. These clips are formed preferably of flat wire secured to the carrier by rivets or by any other desired means, each clip consisting of a body-portion having fingers 9 extending toward each other, as clearly illustrated. To attach or detach the carrier, it is only necessary to contract the transverse area of the belt slightly to permit the fingers 9 to enter the loops 6. A sufficient number of these metal loop devices may be provided to permit the carriers to be adjusted upon the belt to suit the convenience of the wearer. After the belt has been contracted to permit the fingers to be inserted in the loops, it is released and at once assumes its former flattened position with the result that the fingers are securely held by the loops.

In the construction shown in Fig. 5 in lieu of the metal loops, I weave upon the outer surface of the belt, a number of transversely-disposed loops or sleeves 10, the threads of which are incorporated with the body of the belt or bandoleer and are thus securely held, preventing any possibility of ripping or disengagement as would be liable if they were secured to the belt by sewing. To accomplish this, three separate cloths or warps are used, two of which are bound together by suitable binders so as to form a solid fabric for the belt proper while the third is incorporated or interwoven with the body fabric excepting at regular intervals, where it is woven entirely separate therefrom except along two lines, cross-wise of the belt and not extending to its selvage, where it enters and departs therefrom. The sleeves or loops being woven as described, are of no greater transverse extent than the transverse extent of the body portion of the belt included between the two points of separation from the belt whereby they lie flat. At a point intermediately of their ends they are bound to the body-fabric of the belt by a thread or threads $a$ which greatly strengthens them. The openings at the top and bottom of these sleeves or loops are of suitable size to receive the ends of the metal fingers 9 which are inserted therein as in the first construction described by contracting the belt transversely. Said sleeves or loops may be woven at regular intervals throughout the entire length of the belt or at the sides only, the remainder of the belt having an unbroken surface if so desired. A sufficient number of the sleeves or loops may be formed to enable the carrier or carriers to be adjusted on the belt either forward or back of the ordinary position. The end-plates of the belt consist each, of a socket-portion 11 to receive the ends of the belt to which it is secured, and a fastener comprising a body-portion 12 having disposed upon the inner face thereof, the flat fingers 13. A fastener is thus provided, which, like the clip 8, is of the contour in edge elevation substantially of the capital letter C. These fingers are inserted in loops or sleeves 14 woven on the inner face of the belt, in the same manner as the fingers of the clips or the cartridge-carrier are inserted in the sleeves or loops 10. The flat fingers 13 are a decided improvement over the round ones now used, both as to ease of attachment and detachment, and appearance. Further, by the use of the sleeves and flat fingers, no eyelets in the belt are necessary, which is a decided improvement.

In the modification illustrated in Figs. 4 and 8, the flat fingers 13 extend through openings formed in the body-portion 12 of the end-plate, to the rear face thereof. The suspenders 14' are detachably connected with the belt by means of the fasteners 15 which are similar to those described in connection with the detachable carrier, consisting of a body-portion secured to the suspender by riveting or otherwise and fingers 16, to engage in either the woven or the metal loops on the outer surface of the belt, as the case may be. This form of fastener affords a convenient attaching means for the suspenders, the latter being thereby readily attached to or detached from the belt and when attached thereto securely held from disengagement therefrom. In the case of an ordinary leather belt, the loops to receive the metal fingers of the carriers may be made separately of the leather, and sewed in position, harness fashion, or the metal loops shown in the first construction described may be riveted thereto. Also, in the case of a woven belt, loops of woven fabric may be formed by weaving separately, pieces of a sufficient size and securing the same to the belt by stitching or otherwise.

From the above description, it will be seen that I have provided a belt or bandoleer having a detachable cartridge carrier which may be readily attached thereto or removed therefrom in such a manner that its accidental disengagement is positively prevented, and at the same time no loops or metal fingers intervene between the rear face of the belt or bandoleer and the wearer. Further, the carrier is not attached to the belt or bandoleer by any means which pass over or through the same, thereby adding to the strength and durability of the structure.

While I have described my invention as relating more particularly to belts and carriers for cartridges, it may be applied to other articles, one of which is required to be suspended from the other in a similar manner, and for a similar purpose.

Having thus fully described my invention, what I claim as new, and desire to secure by Letters Patent of the United States, is:—

1. A cartridge belt comprising a belt proper having a plurality of spaced, transversely-arranged open-ended sleeves or loops, a detachable woven fabric cartridge-carrier comprising a plurality of cartridge pockets, and attaching-members comprising flat metallic clips secured to the fabric of the carrier on the rear side of the latter and spaced from each other, each clip being substantially C-shaped with the arms thereof adapted to be inserted in the open ends of the sleeves by contracting the belt proper transversely.

2. A cartridge belt comprising a woven fabric belt proper having a plurality of spaced transversely-arranged open-ended loops or sleeves formed integral therewith in such manner as to normally lie flat against the face thereof, a detachable woven fabric carrier comprising a plurality of cartridge pockets, and attaching members comprising metal clips secured to the fabric of the carrier on the rear side of the latter and spaced from each other, each clip being substantially C-shaped with the arms thereof adapted to be inserted in the open ends of the sleeves.

3. The combination of a cartridge belt provided upon its outer surface with loops, of a cartridge carrier comprising a plurality of cartridge pockets and carrying attaching fingers to engage in said loops, and suspenders carrying attaching fingers to also engage in the loops carried by the belt.

4. A woven cartridge belt comprising a belt proper having loops or sleeves upon its outer face, the transverse extent of said loops or sleeves being not greater than the transverse extent of the portion of the belt included between the two points of separation of the sleeves or loops therefrom, and a carrier comprising a plurality of pockets and provided with attaching fingers for engagement in said loops or sleeves.

In testimony whereof I affix my signature, in presence of two witnesses.

FRANK R. BATCHELDER.

Witnesses:
W. H. BEVANS,
KENNETH P. CLARKE.